(12) United States Patent
Guddanti et al.

(10) Patent No.: US 6,985,675 B2
(45) Date of Patent: Jan. 10, 2006

(54) IMAGE FORMING DEVICES, METHODS OF OPERATING AN IMAGE FORMING DEVICE AND METHODS OF MONITORING AN ENVIRONMENT PROXIMATE TO AN IMAGE FORMING DEVICE

(75) Inventors: Srinivas Guddanti, Boise, ID (US); Chet M. Butikofer, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 390 days.

(21) Appl. No.: 10/016,317

(22) Filed: Dec. 6, 2001

(65) Prior Publication Data

US 2003/0108354 A1 Jun. 12, 2003

(51) Int. Cl.
G03G 15/00 (2006.01)
G03G 21/20 (2006.01)

(52) U.S. Cl. .............................. 399/8; 399/44; 399/91
(58) Field of Classification Search ................. 399/44, 399/91, 94, 97, 8; 702/103, 187, 188
See application file for complete search history.

(56) References Cited

U.S. PATENT DOCUMENTS

| | | | | |
|---|---|---|---|---|
| 5,148,218 A | * | 9/1992 | Nakane et al. | |
| 5,384,622 A | * | 1/1995 | Hirata et al. | 399/8 |
| 5,491,540 A | | 2/1996 | Hirst | |
| 5,822,221 A | * | 10/1998 | Groenteman | 399/8 |
| 5,933,676 A | * | 8/1999 | Ohno | 399/8 |
| 5,956,487 A | | 9/1999 | Venkatraman et al. | |
| 5,966,557 A | * | 10/1999 | Wada | 399/44 |
| 6,006,045 A | * | 12/1999 | Miyawaki | 399/8 |
| 6,108,492 A | * | 8/2000 | Miyachi | 399/8 |
| 6,181,885 B1 | * | 1/2001 | Best et al. | |
| 6,348,873 B1 | * | 2/2002 | Wang et al. | 702/130 |
| 6,349,269 B1 | * | 2/2002 | Wallace, Jr. | 702/130 |
| 6,385,407 B1 | * | 5/2002 | Inose | |
| 6,400,462 B1 | * | 6/2002 | Hille | 399/8 |
| 6,463,226 B2 | * | 10/2002 | Kitajima et al. | 399/44 |
| 6,487,375 B2 | * | 11/2002 | Ferrer et al. | 399/8 |
| 6,489,884 B1 | * | 12/2002 | Lamberson et al. | 399/8 |
| 6,499,821 B1 | * | 12/2002 | Nozawa | |
| 6,591,296 B1 | * | 7/2003 | Ghanime | 702/188 |
| 6,641,244 B2 | * | 11/2003 | Dougherty et al. | |
| 6,665,089 B1 | * | 12/2003 | Austin et al. | |
| 2003/0036885 A1 | * | 2/2003 | Suermondt et al. | 702/187 |
| 2003/0055594 A1 | * | 3/2003 | Bunker et al. | |

FOREIGN PATENT DOCUMENTS

| | | | | |
|---|---|---|---|---|
| JP | 04115315 A | * | 4/1992 | |
| JP | 6-35627 A | * | 2/1994 | |
| JP | 6-84391 | * | 3/1994 | |
| JP | 11-143151 A | * | 5/1999 | |
| JP | 11143151 A | * | 5/1999 | |
| JP | 11176150 A | * | 7/1999 | |
| JP | 2001084201 A | * | 3/2001 | |
| JP | 2001249504 A | * | 9/2001 | |

* cited by examiner

Primary Examiner—Susan Lee

(57) ABSTRACT

Image forming devices, methods of operating an image forming device, and methods of monitoring an environment proximate to an image forming device are described. One aspect provides an image forming device including an image engine configured to form hard images; an environmental sensor configured to monitor at least one environmental condition proximate to the image forming device and to provide data indicative of the at least one environmental condition; and an interface configured to communicate the at least one environmental condition externally of the image forming device.

30 Claims, 2 Drawing Sheets

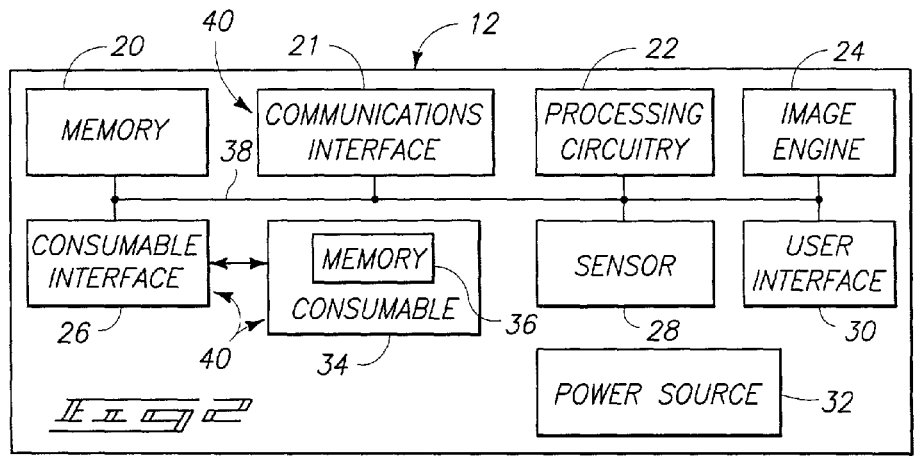
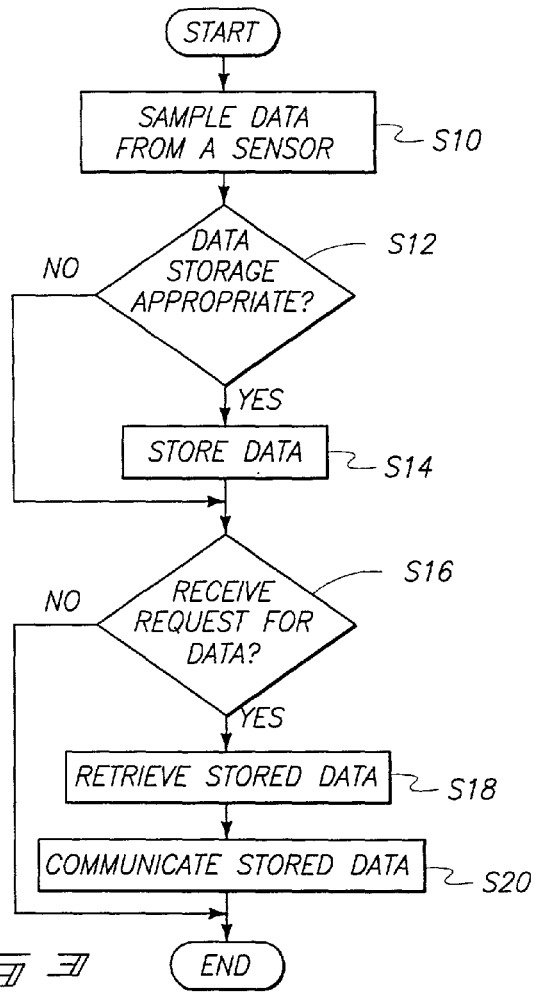

IMAGE FORMING DEVICES, METHODS OF OPERATING AN IMAGE FORMING DEVICE AND METHODS OF MONITORING AN ENVIRONMENT PROXIMATE TO AN IMAGE FORMING DEVICE

FIELD OF THE INVENTION

The invention relates to image forming devices, methods of operating an image forming device and methods of monitoring an environment proximate to an image forming device.

BACKGROUND OF THE INVENTION

Personal computers are utilized in a variety of work, home and other numerous applications. Image forming devices have enjoyed continued and expansive growth along with the growth of personal computers. The usage of personal computers and image forming devices has expanded to numerous countries having wide ranging climates and environmental conditions. Accordingly, image forming devices are subjected to a wide range of environmental conditions in common use.

During development, image forming devices are tested in a wide range of environmental conditions to assure proper operations. Environmental conditions such as temperature and humidity may greatly impact the operation of various components within the image forming devices. For example, rubber compounds utilized within media handling components are effected by environmental conditions. Accordingly, testing to assure operations in a wide range of environmental conditions is desired.

Typically, manufacturers do not have appropriate information to tailor testing and accordingly devices are tested in all possible environmental conditions for proper operation although the image forming devices may never be utilized in many of the tested environmental conditions. For example, exemplary temperature ranges for testing include 10° C. to 35° C. and perhaps 10% to 80% relative humidity even though image forming devices may only be used within subsets of the wide ranges of temperature and humidity. Such extensive testing of image forming devices over such a wide range of conditions is time consuming and expensive.

SUMMARY OF THE INVENTION

The invention relates to image forming devices, methods of operating an image forming device and methods of monitoring an environment proximate to an image forming device.

According to one aspect of the invention, an image forming device comprises an image engine configured to form hard images; an environmental sensor configured to monitor at least one environmental condition proximate to the image forming device and to provide data indicative of the at least one environmental condition; and an interface configured to communicate data indicative of the at least one environmental condition externally of the image forming device.

According to another aspect of the invention, a method of operating an image forming device comprises providing an image forming device configured to form hard images; sensing at least one environmental condition of an environment proximate to the image forming device; and communicating data regarding the at least one environmental condition externally of the image forming device.

According to yet another aspect of the invention, a method of monitoring an environment comprises providing an image forming device configured to form hard images and to monitor at least one environmental condition proximate to the image forming device and to communicate data regarding the at least one environmental condition externally of the image forming device; and receiving the data regarding the at least one environmental condition from the image forming device.

Other aspects are provided, some of which are disclosed herein.

DESCRIPTION OF THE DRAWINGS

FIG. 2 is a functional block diagram depicting components of an exemplary image forming device of the image forming system.

FIG. 3 is a flow chart depicting an exemplary methodology executable within the image forming device.

DETAILED DESCRIPTION OF THE INVENTION

Figure 1:
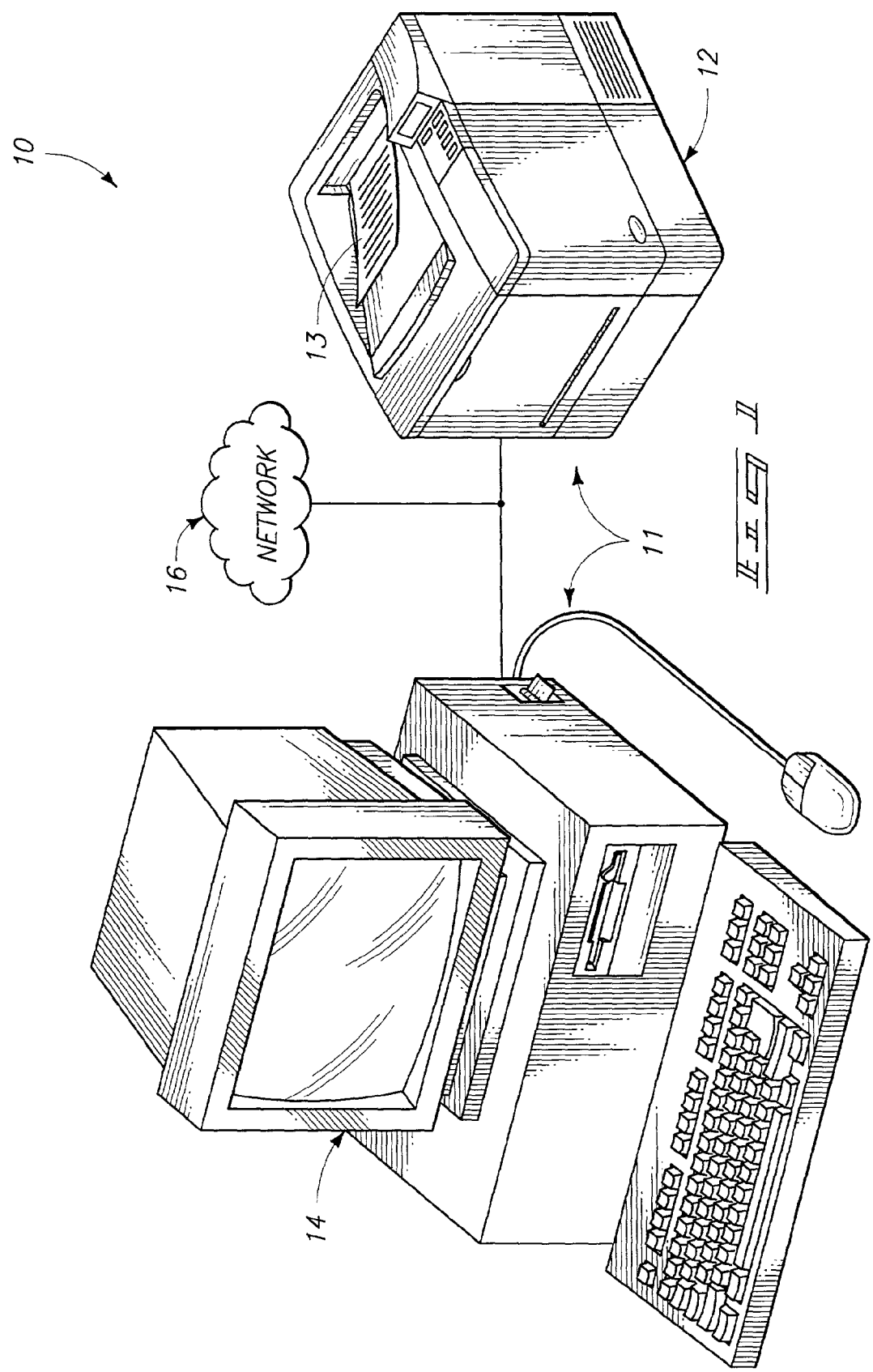
FIG. 1 is an illustrative representation of a computer network environment including an image forming system.

FIG. 1 depicts an exemplary computer network environment 10 including an image forming system 11. The image forming system 11 includes one or more image forming device 12 and one or more host device 14 (only one image forming device and one host device are depicted in the exemplary arrangement of FIG. 1) coupled with a network 16. The depicted system configuration is exemplary and in other implementations, image forming device 12 may be arranged to communicate with only one of host device 14 or network 16, or to operate as a stand-alone unit.

Image forming device 12 and host device 14 are configured to communicate with one another as well as with devices of network 16. An exemplary network 16 includes additional host devices configured to send jobs to and\or communicate with image forming device 12 and may be implemented in a private network arrangement (e.g., an intranet), a public network arrangement (e.g., the internet), or another network configuration, including for example, a combination of public and private devices.

Exemplary image forming devices 12 include printers, facsimile devices, copiers, multiple-function devices, or other devices capable of forming hard images upon imaging media 13. Exemplary hard images include images provided upon output media and comprise printed media in one example.

Image forming device 12 utilizes one or more consumable to form hard images. Exemplary consumables utilized within an image forming device 12 implemented as a printer, for example, include imaging media 13 (e.g., paper, transparencies, roll media, etc.), marking agents (e.g., toner, ink), components having fixed life spans (e.g., fuser assembly), and other expendable items utilized to complete desired jobs. Typically, a consumable is replaced or replenished upon consumption of a useful life of the consumable. As used herein, the term consumable includes an entirety of a consumable assembly including in an exemplary toner configuration, a toner cartridge housing and toner therein and any associated hardware, such as a memory device described below with respect to reference 36 of FIG. 2.

An exemplary host device 14 is implemented as a personal computer having an Intel(™) processor or AMD(™) processor (not shown), for example. Other host device 14 configurations are possible. Host device 14 provides image data to be imaged (e.g., text, illustrations, etc.) to image forming device 12 in the exemplary embodiment. In addition, devices of network 16 may also supply image data to image forming device 12 for the generation of hard images. Host device 14 or networked devices may also be utilized to reconfigure or control operations of image forming device 12, using respective printer driver software for example. In addition to receiving external image data, image data may be generated or otherwise originated internally of image forming device 12.

Referring to FIG. 2, components of an exemplary image forming device 12 are depicted. The exemplary embodiments disclosed herein are discussed with reference to a printer application wherein device 12 is implemented as a printer, such as a LaserJet 4100(™) laser printer or a LaserJet 9000(™) laser printer, available from Hewlett-Packard Company, although the present invention applies to any image forming device configuration capable of forming hard images. In addition, some of the depicted components of FIG. 2 are optional and other arrangements of image forming device 12 including other structural implementations configured to form hard images are possible.

As shown, the exemplary image forming device 12 includes a memory 20, a communications interface 21, processing circuitry 22, an image engine 24, a consumable interface 26, a sensor 28, a user interface 30, an internal power source 32 and a consumable 34. A bus 38 is configured to implement bidirectional communications between the respective components of image forming device 12.

Memory 20 is configured to store executable instructions configured to cause processing circuitry 22 to control operations of image forming device 12. Memory 20 is further configured to store digital data usable within device 12. For example, memory 20 is configured to store image data to be rasterized and imaged using image engine 24, executable instructions usable by processing circuitry 22 to implement imaging operations and to control other operations of image forming device 12, as well as other digital data to be stored within image forming device 12. Exemplary memory comprises a hard disk, random access memory (RAM), read only memory (ROM), and/or flash memory in but one exemplary embodiment.

Communications interface 21 is arranged to implement communications of device 12 with external components, such as host device 14 and\or private and\or public devices of network 16. In exemplary configurations, communications interface 21 is implemented as a modem or a network interface card (NIC) configured to implement external communications.

Processing circuitry 22 is configured to execute executable instructions to control operations of image forming device 12. Processing circuitry 22 is configured to implement operations described herein with respect to monitoring one or more environmental condition of the environment in which image forming device 12 resides or is otherwise proximate to device 12. Processing circuitry 22 is arranged to implement communications of the monitored environmental condition externally of device 12 according to additional inventive aspects. Processing circuitry 22 is configured to execute executable instructions stored within memory 20 comprising, for example, software and/or firmware instructions. An exemplary configuration of processing circuitry 22 is a microprocessor implemented upon a formatter board with associated memory 20.

Image engine 24 implements formation of hard images upon media 13. According to the exemplary described printer embodiment, image engine 24 is implemented as a print engine. An exemplary print engine includes a developing assembly and a fuser assembly (not shown) to respectively form hard images using marking or developing agents and to affix the agents to media 13. Other constructions or embodiments of image engine 24 are possible.

Consumable interface 26 is configured to couple with consumable 34 to establish communications therewith. An exemplary consumable 34 includes a memory 36 to store digital information. Exemplary memory 36 includes RAM, flash memory or other configurations. Consumable 34 may be implemented as a toner cartridge including memory 36 embodied as a memory tag, for example. Consumable 34 does not include memory 36 according to other possible configurations. Further, device 12 may include a plurality of different consumables 34 in other embodiments for implementing imaging operations.

Consumable interface 26 is utilized to write data to memory 36 of consumable 34 and to retrieve data therefrom. Exemplary communications between consumable interface 26 and consumable 34 are described in U.S. Pat. No. 5,491,540, which is incorporated herein by reference.

Sensor 28 is configured to monitor one or more ambient or environmental condition of the environment proximate to image forming device 12 (e.g., an environment in which device 12 is installed, stored or otherwise resides). Exemplary configurations of sensor 28 include a thermometer arranged to monitor an environmental condition comprising temperature and\or a hygrometer arranged to monitor an environmental condition comprising relative humidity. Other sensor configurations are possible for monitoring other environmental conditions, such as a barometer for monitoring pressure. In addition, a plurality of sensors 28 may be provided in other embodiments to monitor a plurality of environmental conditions. Sensor 28 may be provided within individual components of device 12, such as consumable 34. Sensor 28 provides data indicative of a monitored environmental condition in the form an electrical output signal in the illustrated exemplary configuration.

User interface 30 is implemented as a control panel and a display in the described embodiment. A user inputs commands and other information via the control panel and processing circuitry 22 controls the display to depict status and other messages pertinent to image forming device 12 (the control panel and display of user interface 30 are not shown). A user interface may be implemented using software resident upon the host device 14 in another arrangement to allow a user to input commands and other information.

The illustrated internal power source 32 is arranged to provide power to selected components of image forming device 12 in the absence of power from a source external of device 12. In one exemplary arrangement, source 32 is embodied as a battery configured to supply power to enable acquisition of environmental condition data without external power. For such an arrangement, source 32 supplies power to appropriate memory 20, 36, sensor 28, processing circuitry 22 and\or other desired components to enable data acquisition. Configurations of image forming device 12 including power source 32 enable monitoring of environmental conditions prior to installation of device 12 (e.g., during periods of storage of device 12 in warehouses).

According to aspects of the present invention, structures and methodologies are disclosed which enable monitoring of environmental conditions proximate to image forming devices 12 and storage of environmental condition data or information. Additional aspects of the invention provide communication of monitored environmental conditions. Using such obtained environmental condition information, testing of image forming devices or other devices may be tailored and conducted to more closely resemble environments wherein the image forming devices are commonly used and/or stored as determined from the environmental condition information. For example, as described below, aspects of the invention enable communication of obtained environmental condition information or data to a manufacturer of image forming device 12 which may be utilized to tailor or focus testing procedures of subsequent image forming or other devices.

As described above, sensor 28 is implemented to monitor environmental conditions proximate to device 12 and to output a signal indicative of the monitored environmental conditions. Processing circuitry 22 is configured to extract or sample the signal from sensor 28 to provide data corresponding to the environmental conditions proximate to image forming device 12 and to analyze the data, if desired.

In addition, processing circuitry 22 is also configured to control storage of the environmental condition data using memory 20 and/or memory 36 if storage is appropriate. Such storage of environmental condition data extracted from sensor 28 provides a history of the environmental conditions to which the image forming device 12 has been exposed. Processing circuitry 22 may be configured to control the storage of data from sensor 28 at predetermined dates or moments in time or responsive to significant changes in data from sensor 28 or according to other criteria. According to aspects of the invention, processing circuitry 22 is arranged to monitor the data and to control the storage of the data responsive to the monitoring.

Accordingly, the present invention implements environmental condition monitoring according to one or more different procedure according to aspects of the present invention. For example, controlling the monitoring of the environmental conditions and acquisition of environmental condition data may be implemented in different ways. In one arrangement, and upon manufacture of image forming device 12, processing circuitry 22 may be programmed to calculate current time and date information. Processing circuitry 22 thereafter accesses environmental condition data from sensor 28 and stores such data at predetermined moments in time and\or at predetermined dates according to one embodiment.

According to another aspect, processing circuitry 22 is arranged to monitor environmental condition data derived from sensor 28 and to control storage of such data responsive to an analysis of the data. For example, processing circuitry 22 may only store data which has changed in excess of a predetermined threshold compared with a previous data extraction from sensor 28. Such procedure may be utilized to store data corresponding to sufficient changes in the data to conserve data storage resources, such as memory 20 and/or memory 36.

Additional aspects of the present invention provide communication of information or data regarding monitored environmental conditions externally of the image forming device 12. The data is useful in at least one application to determine appropriate test conditions for other devices, including image forming devices. Such testing may be utilized to enhance the performance of the devices.

A plurality of communication methods are contemplated for communicating environmental condition data externally of the image forming device 12. Image forming devices 12 of the present invention includes one or more interface configured to externally communicate data regarding at least one environmental condition. For example, in the image forming device 12 depicted in FIG. 2, plural interfaces 40 are provided to enable communication of data regarding the environmental conditions externally of image forming device 12. Exemplary interfaces 40 include communications interface 21 and consumable interface 26 operating in conjunction with memory 36 of consumable 34. According to other arrangements, image forming device 12 includes only one interface 40 configured to communicate the data regarding the at least one environmental condition externally of the image forming device 12. In addition, other interface configurations are possible to externally communicate data regarding environmental conditions.

In one embodiment, processing circuitry 22 is configured via appropriate executable code stored within memory 20 to function as an embedded web server to implement communications externally of image forming device 12. Processing circuitry 22 implemented as an embedded web server operates to communicate according to a client/server arrangement. Further details regarding embedded web server functionality implemented by processing circuitry 22 are described in detail in U.S. Pat. No. 5,956,487, incorporated herein by reference.

For example, an appropriate host device (e.g., supported by the manufacturer of device 12) is coupled with network 16 and is configured to address and to submit a request to image forming device 12 to request environmental condition data from device 12. Processing circuitry 22 is arranged to process the request regarding communication of the environmental condition data.

Once the request is identified as requesting environmental condition data, processing circuitry 22 extracts the data from appropriate memory 20 and/or memory 36 to formulate an appropriate reply. Processing circuitry 22 thereafter communicates the reply using communications interface 21 and network 16 to the appropriate requesting client device or other appropriate destination. Following successful communication of the environmental condition data, it may be desirable to configure processing circuitry 22 to delete the communicated environmental condition data from the appropriate memory 20 and\or memory 36 to conserve resources.

According to another aspect of the present invention, communication using communications interface 21 may not be possible (e.g., lack of Internet service) or it may be desired to provide redundant communication of the environmental condition data. As mentioned previously, processing circuitry 22 forwards environmental condition data to consumable 34 using consumable interface 26 for storage within memory 36 according to certain embodiments of the invention. Upon exhaustion of a usable portion of consumable 34, a user may be requested to return the container or other remaining portion of consumable 34 to an appropriate party (e.g., manufacturer of device 12) wherein environmental condition data stored within memory 36 may be extracted. Incentives such as coupons towards future consumables or other incentives may be provided to encourage users to return consumables 34 to a manufacturer or other desired recipient using standard mail facilities, for example. The manufacturer or other party may provide a prepaid shipping package for consumable 34 to further facilitate return of the consumable 34 for appropriate data extraction. Upon receipt of consumable 34 within the manufacturer or other recipient, environmental condition data is extracted from memory 36 according to one exemplary embodiment to receive the data.

The data communicated and received from image forming devices 12 and corresponding to environmental conditions wherein such devices 12 are utilized may be analyzed to formulate subsequent testing operations for other products, including for example image forming devices 12, or utilized for other purposes. For example, specific ranges of environmental conditions may be identified to tailor subsequent testing. More specifically, in the described testing application, quantitative parameters including narrowed temperature ranges, relative humidity ranges or other desired environmental conditions may be developed to provide testing procedures which more closely model real world environmental conditions wherein the devices will be utilized. Accordingly, aspects of the present invention facilitate information gathering regarding particular environments in which the devices are used to enable tailored testing of the devices.

FIG. 3 depicts an exemplary methodology executable by processing circuitry 22 of image forming device 12 to implement environmental condition data acquisition and communication. The depicted steps are exemplary and other methods may be utilized including additional, less, or alternative steps. Executable code configured to cause processing circuitry 22 to implement the depicted methodology may be provided within memory 20 in an exemplary configuration.

Initially, at a step S10, processing circuitry 22 samples data from sensor 28.

At a step S12, processing circuitry 22 determines whether data storage is appropriate. For example, processing circuitry 22 may compare the most recently acquired data sample with a last stored data sample to determine whether a delta change between the samples exceeds a predetermined threshold wherein storage is desired. Processing circuitry 22 proceeds to a step S16 if the condition of step S12 is negative.

Alternatively, processing circuitry 22 proceeds to a step S14 to store the most recently acquired data sample to create a history of environmental condition data samples if the condition of step S12 is affirmative.

At a step S16, processing circuitry 22 monitors for the reception of a request for data from an external source. Processing circuitry 22 terminates the current execution of the program if the condition of step S16 is negative.

Otherwise, processing circuitry 22 proceeds to step S18 to retrieve stored data from one or more appropriate memory if the condition of step S16 is affirmative.

At a step S20, processing circuitry 22 initiates communication of the stored data using communications interface 21.

The protection sought is not to be limited to the disclosed embodiments, which are given by way of example only, but instead is to be limited only by the scope of the appended claims.

What is claimed is:

1. An image forming device comprising:
    an image engine configured to form hard images;
    an environmental sensor configured to monitor at least one environmental condition proximate to the image forming device and to provide data indicative of the at least one environmental condition;
    an interface configured to communicate the data indicative of the at least one environmental condition externally of the image forming device;
    a memory; and
    processing circuitry configured to control storage of the data using the memory to provide a history comprising a plurality of values of the at least one environmental condition to which the image forming device has been exposed at a plurality of different moments in time.

2. The device of claim 1 wherein the image engine is configured to use a consumable to form the hard images, and the interface comprises a memory of the consumable.

3. The device of claim 1 wherein the interface comprises a communications interface adapted to communicate with devices external of the image forming device.

4. The device of claim 1 further comprising processing circuitry configured as an embedded web server and configured to communicate the data with respect to a client device external of the image forming device.

5. The device of claim 1 wherein the processing circuitry is configured to control the storage of the data at a predetermined moment in time.

6. The device of claim 1 wherein the processing circuitry is configured to monitor the data and to control the storage of the data responsive to the monitoring.

7. The device of claim 1 further comprising an internal power source configured to provide power to the sensor in an absence of power from a source external of the image forming device.

8. The device of claim 1 wherein the environmental sensor is configured to monitor the at least one environmental condition comprising a plurality of environmental conditions proximate to the image forming device and comprising humidity and temperature.

9. The device of claim 1 wherein the image engine comprises a print engine of the image forming device embodied as a printer.

10. The device of claim 1 wherein the data of the history comprises the values for the at least one environmental condition stored over a period of time.

11. The device of claim 1 further comprising an internal power source configured to provide operational power to permit storage of the data to provide the history of the at least one environmental condition during an absence of power from a source external of the image forming device.

12. The device of claim 1 wherein the processing circuitry is configured to control outputting of the history externally of the image forming device.

13. The device of claim 1 wherein the processing circuitry is configured to control outputting of the history.

14. The device of claim 1 wherein the memory is configured to store the history prior to the image forming device being implemented for the first time to form hard images.

15. A method of operating an image forming device, the method comprising:
    providing an image forming device configured to form hard images;
    sensing at least one environmental condition of an environment proximate to the image forming device;
    communicating data regarding the at least one environmental condition externally of the image forming device;
    receiving a request within the image forming device from a source external of the image forming device, and the communicating comprises communicating responsive to the receiving; and
    wherein the providing comprises providing the image forming device configured to use a consumable to form hard images, and the communicating comprises storing the data regarding the at least one environmental condition using the consumable.

16. The method of claim 15 wherein the sensing comprises sensing a plurality of environmental conditions comprising temperature and humidity.

17. The method of claim 15 wherein the providing comprises providing the image forming device embodied as a printer.

18. The method of claim 15 wherein the communicating comprises outputting the data regarding the at least one environmental condition externally of the image forming device.

19. A method of monitoring an environment proximate to an image forming device configured to form hard images, the method comprising:
providing an image forming device configured to form hard images and to monitor at least one environmental condition proximate to the image forming device and to communicate data regarding the at least one environmental condition externally of the image forming device;
receiving the data regarding the at least one environmental condition from the image forming device; and
analyzing the data regarding the at least one environmental condition after the receiving to determine a quantitative parameter for the at least one environmental condition for testing other image forming devices.

20. The method of claim 19 further comprising communicating a request to the image forming device, and wherein the communicating the data is responsive to the communicating the request.

21. The method of claim 19 wherein the providing comprises providing the image forming device configured to use a consumable, and wherein the receiving the data comprises extracting the data from the consumable.

22. The method of claim 19 wherein the providing comprises providing the image forming device configured to monitor the at least one environmental condition comprising a plurality of environmental conditions comprising temperature and humidity.

23. The method of claim 19 wherein the quantitative parameter comprises a temperature range.

24. The method of claim 19 further comprising outputting the data regarding the at least one environmental condition externally of the image forming device.

25. An image forming device comprising:
an image engine configured to form hard images;
an environmental sensor configured to monitor at least one environmental condition proximate to the image forming device and to provide data indicative of the at least one environmental condition;
an interface configured to communicate the data indicative of the at least one environmental condition externally of the image forming device; and
wherein the image engine is configured to use a consumable to form the hard images, and the interface comprises a memory of the consumable.

26. The device of claim 25 wherein the interface is configured to output the data indicative of the at least one environmental condition externally of the image forming device.

27. An image forming device testing method comprising:
providing a first image forming device to be tested;
accessing a history comprising data indicative of at least one environmental condition to which at least one second image forming device has been exposed;
determining at least one testing criteria responsive to the accessing of the history; and
testing the first image forming device using the testing criteria after the determining.

28. An image forming device comprising:
an image engine configured to form hard images;
an environmental sensor configured to monitor at least one environmental condition proximate to the image forming device and to provide data indicative of the at least one environmental condition;
an interface configured to communicate the data indicative of the at least one environmental condition externally of the image forming device;
a memory;
processing circuitry configured to control storage of the data using the memory to provide a history of the at least one environmental condition to which the image forming device has been exposed; and
wherein the image engine is configured to use a consumable to form the hard images, and the interface comprises a memory of the consumable.

29. An image forming device comprising:
an image engine configured to form hard images;
an environmental sensor configured to monitor at least one environmental condition proximate to the image forming device and to provide data indicative of the at least one environmental condition;
an interface configured to communicate the data indicative of the at least one environmental condition externally of the image forming device;
a memory;
processing circuitry configured to control storage of the data using the memory to provide a history of the at least one environmental condition to which the image forming device has been exposed; and
wherein the processing circuitry is configured to control outputting of the history externally of the image forming device.

30. An image forming device comprising:
an image engine configured to form hard images;
an environmental sensor configured to monitor at least one environmental condition proximate to the image forming device and to provide data indicative of the at least one environmental condition;
an interface configured to communicate the data indicative of the at least one environmental condition externally of the image forming device;
a memory;
processing circuitry configured to control storage of the data using the memory to provide a history of the at least one environmental condition to which the image forming device has been exposed; and
wherein the memory is configured to store the history prior to the image forming device being implemented for the first time to form hard images.

* * * * *